(12) United States Patent
Sebastian

(10) Patent No.: US 11,262,454 B2
(45) Date of Patent: Mar. 1, 2022

(54) DWELL-ANGLE-INDEPENDENT TRACKING AND MONITORING OBJECTS USING LIDAR

(71) Applicant: DSCG SOLUTIONS, INC., Chantilly, VA (US)

(72) Inventor: Richard Sebastian, Frederick, MD (US)

(73) Assignee: DSCG Solutions, Inc., Chantilly, VA (US)

( * ) Notice: Subject to any disclaimer, the term of this patent is extended or adjusted under 35 U.S.C. 154(b) by 912 days.

(21) Appl. No.: 15/906,535

(22) Filed: Feb. 27, 2018

(65) Prior Publication Data

US 2018/0252813 A1    Sep. 6, 2018

Related U.S. Application Data

(60) Provisional application No. 62/465,909, filed on Mar. 2, 2017.

(51) Int. Cl.
| | |
|---|---|
| *G01S 17/66* | (2006.01) |
| *G01S 7/481* | (2006.01) |
| *G01S 17/42* | (2006.01) |
| *G01S 7/48* | (2006.01) |

(52) U.S. Cl.
CPC ............ *G01S 17/66* (2013.01); *G01S 7/4808* (2013.01); *G01S 7/4815* (2013.01); *G01S 7/4817* (2013.01); *G01S 17/42* (2013.01); *G01S 7/4816* (2013.01)

(58) Field of Classification Search
CPC ...... G01S 17/66; G01S 7/4815; G01S 7/4817; G01S 17/42; G01S 7/4808; G01S 7/4816
USPC ....................................................... 356/5.01
See application file for complete search history.

(56) References Cited

FOREIGN PATENT DOCUMENTS

| EP | 0328443 B1 | 1/1993 |
|---|---|---|
| EP | 1212639 B1 | 10/2003 |
| TW | 201418662 A | 5/2014 |
| TW | 201508561 A | 3/2015 |

OTHER PUBLICATIONS

International Search Report and Written Opinion for International Application No. PCT/US2018/020546, dated May 25, 2018, 7 pages.
Salman; "From 3D Point Clouds To Feature Preserving Meshes"; Université Nice Sophie Antipolis, Dec. 16, 2010; 87 pages.
Office Action for Taiwanese Application No. 107106912, dated Dec. 30, 2021, 3 pages.

*Primary Examiner* — Daniel L Murphy
(74) *Attorney, Agent, or Firm* — Brake Hughes Bellermann LLP

(57) ABSTRACT

A remote tracking system such as a LIDAR system may track objects such as human faces. In such objects there is a natural axis of symmetry that is seen to be substantially normal to the orientation of the object. Nevertheless, because the object is typically in motion, one cannot expect that beams incident on the object to be normal to the object consistently. Rather, the beams tend to dwell on the object at some skew angle. In a typical case, the detected beam pattern from a given portion of the object is dependent on this dwell angle. In conventional remote tracking systems, it may be difficult to identify the portion of the object efficiently through all of the possible beam patterns due to variation of the dwell angle. It is an objective of improved techniques described herein to efficiently monitor and track an object regardless of the dwell angle.

18 Claims, 8 Drawing Sheets

DWELL-ANGLE-INDEPENDENT TRACKING AND MONITORING OBJECTS USING LIDAR

RELATED APPLICATION

This Application claims priority to and the benefit of U.S. Provisional Application No. 62/465,909, filed Mar. 2, 2017, entitled, "DWELL-ANGLE-INDEPENDENT TRACKING AND MONITORING OBJECTS USING LIDAR," which is incorporated herein by reference in its entirety.

TECHNICAL FIELD

This description relates to systems and methods for tracking and monitoring objects using Light Detection And Ranging (LIDAR).

BACKGROUND

In some known systems, objects may be tracked using a laser Light Detection And Ranging (LIDAR) system in conjunction with a video system. Some such known systems may be complex and difficult to use. Additionally, in some such known systems, the video system may require light in order to detect the object to be tracked. Thus, a need exists for systems, methods, and apparatus to address the shortfalls of present technology and to provide other new and innovative features.

DETAILED DESCRIPTION

Figure 1:
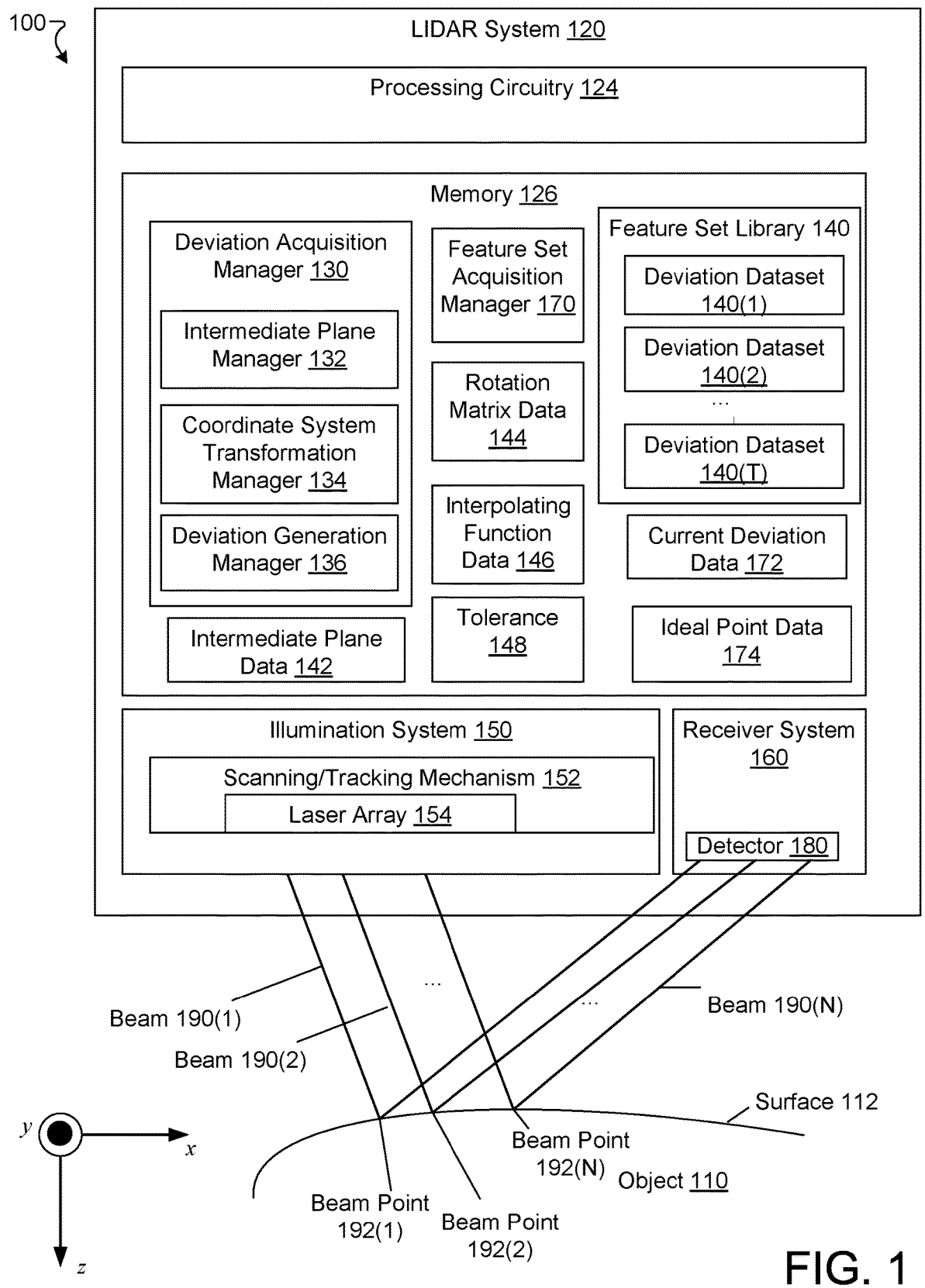
FIG. 1 is a block diagram illustrating an example LIDAR system within an electronic environment in which improved techniques described herein may be performed.

FIG. 1 is a diagram that illustrates an example electronic environment 100 in which improved techniques of tracking an object's motion are performed. The electronic environment 100 includes a LIDAR system 120 that is configured to track and monitor an object 110. Using the LIDAR system 120, tracking of the object 110 can be performed while eliminating visible imaging hardware (e.g., video camera hardware). Accordingly, the LIDAR system 120 can be configured to operate in total darkness, into the sun, etc. The LIDAR system 120 can be less susceptible to motion of the object 110 than conventional systems. Accordingly, the motion of the object 110 can be determined in some implementations solely from LIDAR measurements, without, for example, video.

The object 110 is assumed herein to be a substantially rigid body of some known or unknown shape. For example, the object 110 may be a human face. The object 110 is assumed to be in motion, both linear and rotational, about an arbitrary axis. It should be understood that in the electronic environment shown in FIG. 1, there is a natural axis that is substantially normal to the surface of the object.

Along this natural axis, the object may be described via deviations from a best fit plane at various regions of the object. Such deviations may be stored in a feature set library 140 in which the deviations substantially normal to the surface of the object are mapped to a region of the object.

Nevertheless, because the object 110 is typically in motion, one cannot expect beams incident on the object to be normal to the object consistently. Rather, the beams tend to dwell on the object at some skew angle. In a typical case, the detected beam pattern from a given portion, or feature set, of the object 110 is dependent on this dwell angle. It would be difficult to identify the portion of the object 110 efficiently through all of the possible beam patterns due to variation of the dwell angle. It is an objective of the improved systems and techniques described herein to efficiently monitor and track the object regardless of the dwell angle.

As shown in FIG. 1, the LIDAR system 120 is a single, integrated unit that includes processing circuitry 124, memory 126, an illumination system 150, and a receiver system 160. In some arrangements, the LIDAR system 120 takes the form of a handheld unit that may be pointed at the object 110. However, in other arrangements the components of the LIDAR system 120 may be distributed among different units (e.g., the processing circuitry 124 and memory 126 might be in a computing device separate from a handheld device that includes the illumination system 150 and the receiver system 160).

The processing circuitry 124 includes one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some arrangements, one or more of the components of the LIDAR system 120 can be, or can include, processors configured to process instructions stored in the memory 126.

For example, a deviation acquisition manager 130 (and/or a portion thereof) and a feature set acquisition manager 170, shown as being included within the memory 126 in FIG. 1, can be a combination of a processor and a memory configured to execute instructions related to a process to implement one or more functions.

The illumination system 150 is configured and arranged to produce the illumination that is reflected from the surface 112 of the object 110. As shown in FIG. 1, this illumination takes the form of multiple beams 190(1), . . . , 190(N) of radiation directed along the z-axis. The illumination system 150 includes a scanning mechanism 152, which includes a laser array 154.

The scanning/tracking mechanism 152 is configured and arranged to move the laser array 154 in a scanning and/or tracking motion. As shown in FIG. 1, the scanning/tracking mechanism 152 is configured to move each laser in the laser array 154 substantially along the x and y directions, i.e., orthogonally to the direction of the beams 190(1), . . . , 190(N). The scanning/tracking mechanism 152 moves the laser array 154 altogether, so that all movements are performed in one motion.

The laser array 154 is configured and arranged to produce an array of beams (e.g., beams 190(1), . . . , 190(N)) of laser radiation, i.e., substantially coherent, quasi-monochromatic light. In many arrangements, the laser array 154 includes a rectangular array of lasers, each producing laser radiation at some wavelength. Each laser in the rectangular array corresponds to a sample point on the surface 112 of the object 110 where the beam produced by that laser reflects off the surface 112. In some arrangements, the wavelength of the light in each beam 190(1), . . . , 190(N) produced by the laser array 154 is 1550 nm. This wavelength has the advantage of being suited to objects that are, for example, human faces. Nevertheless, other wavelengths (e.g., 1064 nm, 532 nm) may be used as well.

The receiver system 160 is configured and arranged to receive the beams reflected from the surface 112 of the object 110 and generate the deviation datasets 140(1), . . . , 140(T) from the received beams. The receiver system 160 may generate either the deviation datasets 140(1), . . . , 140(T) and/or current deviation data 172 using any number of known techniques (e.g., heterodyne detection) and will not be discussed further. The receiver system includes a detector 180 that is configured and arranged to convert the received beams into electrical signals from which the receiver system 160 may generate the deviation datasets 140(1), . . . , 140(T) and/or current deviation data 172. In some arrangements, the detector 180 includes a PIN photodiode; in other arrangements, the detector 180 may include a photomultiplier tube (PMT) or an array of charge-coupled devices (CCDs).

The deviation acquisition manager 130 is configured to perform the computations involved in normalizing beam patterns to those found from illumination at normal incidence so that beam patterns detected from a given portion of the object 110 are substantially independent of dwell angle. The deviation acquisition manager 130 includes an intermediate plane manager 132, a coordinate system transformation manager 134, and a deviation generation manager 136.

The intermediate plane manager 132 is configured to generate an intermediate plane 142 that approximates the surface 112 of the object 110 in the neighborhood of the beams 190(1), 190(2), . . . , 190(N) incident on the surface 112. In many cases, and in the examples discussed herein, the intermediate plane 142 is a best-fit plane that is found by minimizing a least-square error between the beam points 192(1), 192(2), . . . , 192(N) and corresponding points in the intermediate plane 142. Typically, the intermediate plane 142 divides the space occupied by the object 110 into two halves such that, in each half-space, there is at least one beam having its point of contact, e.g., 192(1), 192(2), . . . , 192(N), with the surface in that half-space.

The intermediate plane data 142 includes a unit normal vector defining an orientation of the plane in space and a single point. The single point may be taken to be the point in the plane closest to an anchor point on the surface 112. The anchor point may be taken to be the origin of a coordinate system of the object. Accordingly, a least-squares minimization procedure would find the unit normal and single point that minimizes the sum of the squares of the distances between each beam point 192(1), 192(2), . . . , 192(N) on the surface 112 and respective points in the plane 142 along the normal to the plane 142.

The coordinate system transformation manager 134 is configured to express the beam points 192(1), 192(2), . . . , 192(N) and any other points on the surface 112 in a coordinate system defined by the plane 142. In effect, the coordinate system transformation manager 134 is configured to perform a translation operation and a rotation operation on each of the beam points 192(1), 192(2), . . . , 192(N). In this way, each beam point will have a horizontal plane coordinate, a vertical plane coordinate, and a deviation from the plane.

In performing the translation, the coordinate system transformation manager 134 is configured to define the origin of the intermediate plane 142 to be a translation of the anchor point of the object 110 along the normal of the intermediate plane 142 a distance equal to the distance between the anchor point and the point in the plane. After translating each beam point 192(1), 192(2), . . . , 192(N) in a similar fashion, the coordinate system transformation manager 134 is configured to define a rotation matrix 144 that depends solely on the vertical unit vector of the object coordinate system and the normal of the intermediate plane 142. The coordinate system transformation manager 134 is then configured to apply the rotation matrix 144 to each of the translated beam points. In this way, the deviations of the beam points 192(1), 192(2), . . . , 192(N) from the intermediate plane 142 are the third coordinate in the translated and rotated coordinate system.

The deviation generation manager 136 is configured to generate deviation values 172 from the intermediate plane 142 at a set of ideal points 174. The set of ideal points 174 are typically those of the incident beam pattern at normal incidence to the surface 112. By generating the deviations at these ideal points 174, the location of the beams 190(1), 190(2), . . . , 190(N) on the surface 112 may be determined using the feature set library 140.

The deviation generation manager 126 is configured to generate the deviation values 172 at the ideal points 174 by performing an interpolation operation on the beam points in the coordinate system of the plane 142, i.e., translated and rotated. Because the deviations are simply the third coordinate in the coordinate system of the plane 142, the deviation 172 at the ideal points 174 is simply the value of an interpolating function 146 at the ideal points 174.

In some implementations, if the shape of the object is known ahead of time, then the deviation generation manager 126 may not be needed.

The feature set acquisition manager 170 is configured to determine a location on the surface 112 that the beams 190(1), 190(2), . . . , 190(N) are illuminating given the current deviation data 172. Along these lines, the deviation generation manager 126 is configured to perform a searching operation on the feature set library 140 to find the deviation dataset, e.g., deviation dataset 140(2) that is closest to the current deviation data 172. In some implementations, the searching operation is a nearest neighbor searching operation. In some implementations, the result of the searching operation includes values of a set of parameters corresponding to a particular deviation dataset, e.g., deviation dataset 140(2). In other arrangements, the result of the searching operation may be an average of values of the set of parameters of neighboring deviation datasets.

The feature set acquisition manager 170 is also configured to generate the feature set library 140 by constructing a point cloud based on the object and deriving a surface normal based on the point cloud. Along these lines, the feature set acquisition manager 170 is configured to record the respective deviation values from each portion into memory 126 as deviation dataset 140(1), deviation dataset 140(2), . . . , deviation dataset 140(T).

Figure 2A:
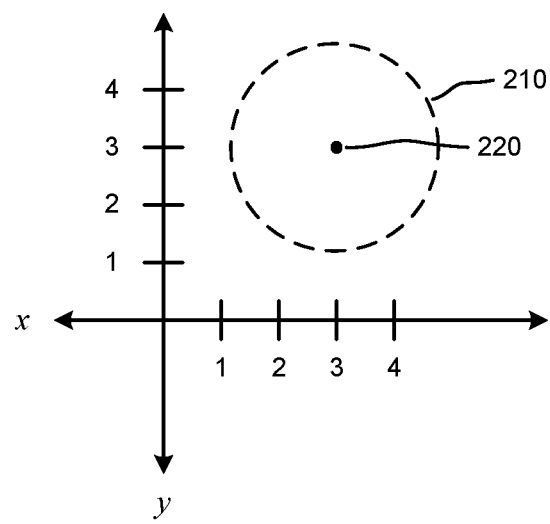
FIG. 2A is a diagram illustrating an example object being tracked within the electronic environment illustrated in FIG. 1.
Figure 2B:
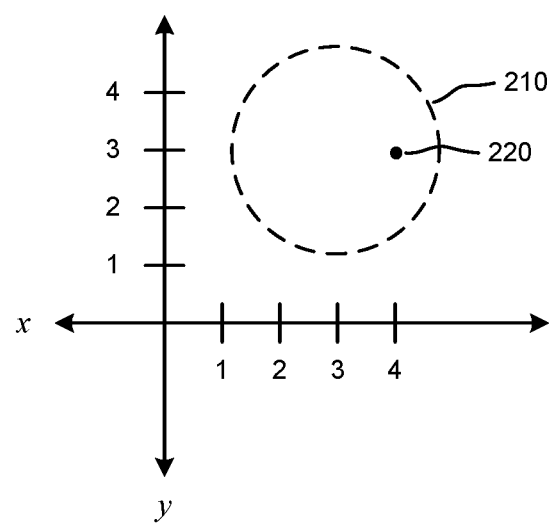
FIG. 2B is a diagram illustrating the example object as tracked within the electronic environment illustrated in FIG. 1.

FIGS. 2A and 2B illustrate an example object 210 that may be observed by (e.g., targeted by) the LIDAR system 120. The object 210 may have any shape, but is represented in FIGS. 2A and 2B as a prolate spheroid. In FIG. 2A, at time T1 a point 220 on the object 210 is being observed by the LIDAR system 120. At time T1 the point 220 is located at (3,3) in the (x,y) plane. As illustrated in FIG. 2B, at time T2 the point 220 is located at (4,3) in the (x,y) plane. The movement of the point may be the result of different types of movements of the object 80. For example, the object 220 may have moved from one location to another (translational movement) or the object 220 may have rotated (for example, about an axis parallel to the y axis of the x-y plane).

Figure 2C:
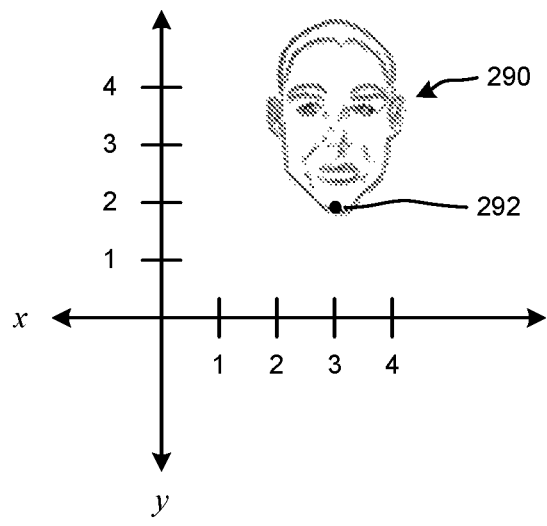
FIG. 2C is a diagram illustrating another example object being tracked within the electronic environment illustrated in FIG. 1.
Figure 2D:
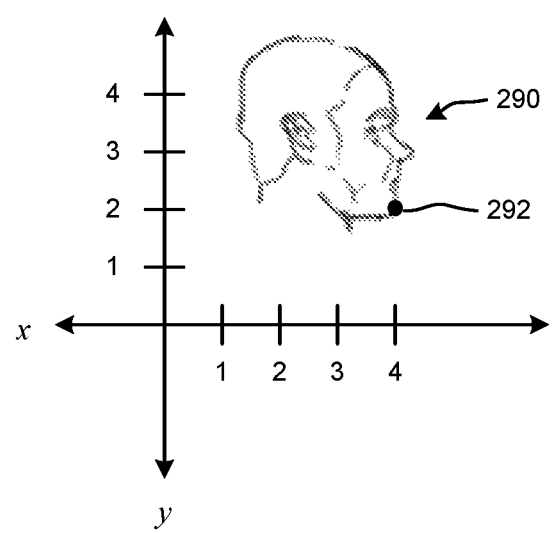
FIG. 2D is a diagram illustrating the other example object as tracked within the electronic environment illustrated in FIG. 1.
Figure 2E:
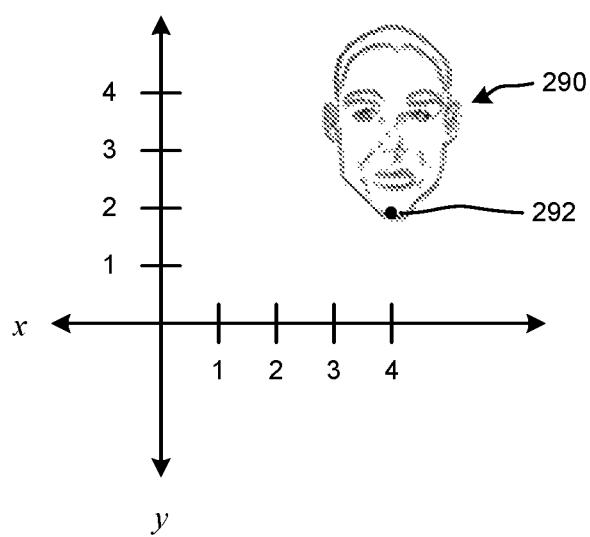
FIG. 2E is a diagram illustrating the other example object as further tracked within the electronic environment illustrated in FIG. 1.

As illustrated in FIGS. 2C, 2D, and 2E a head or face 290 of an individual may be tracked or observed by the LIDAR system 120. Specifically, a point or location 292 of the head or face 290 may be observed. As illustrated in FIG. 2C, at time T1 the point 292 is located at (3,2) in the (x,y) plane. At time T2 the point 292 may be observed to be at (4,2).

The movement of the point may be the result of different types of motion. For example, the person or individual may have rotated their head (for example, about an axis parallel to they axis), as illustrated in FIG. 2D. Alternatively, the person or individual may have moved their head (without any rotation), as illustrated in FIG. 2E.

Figure 3:
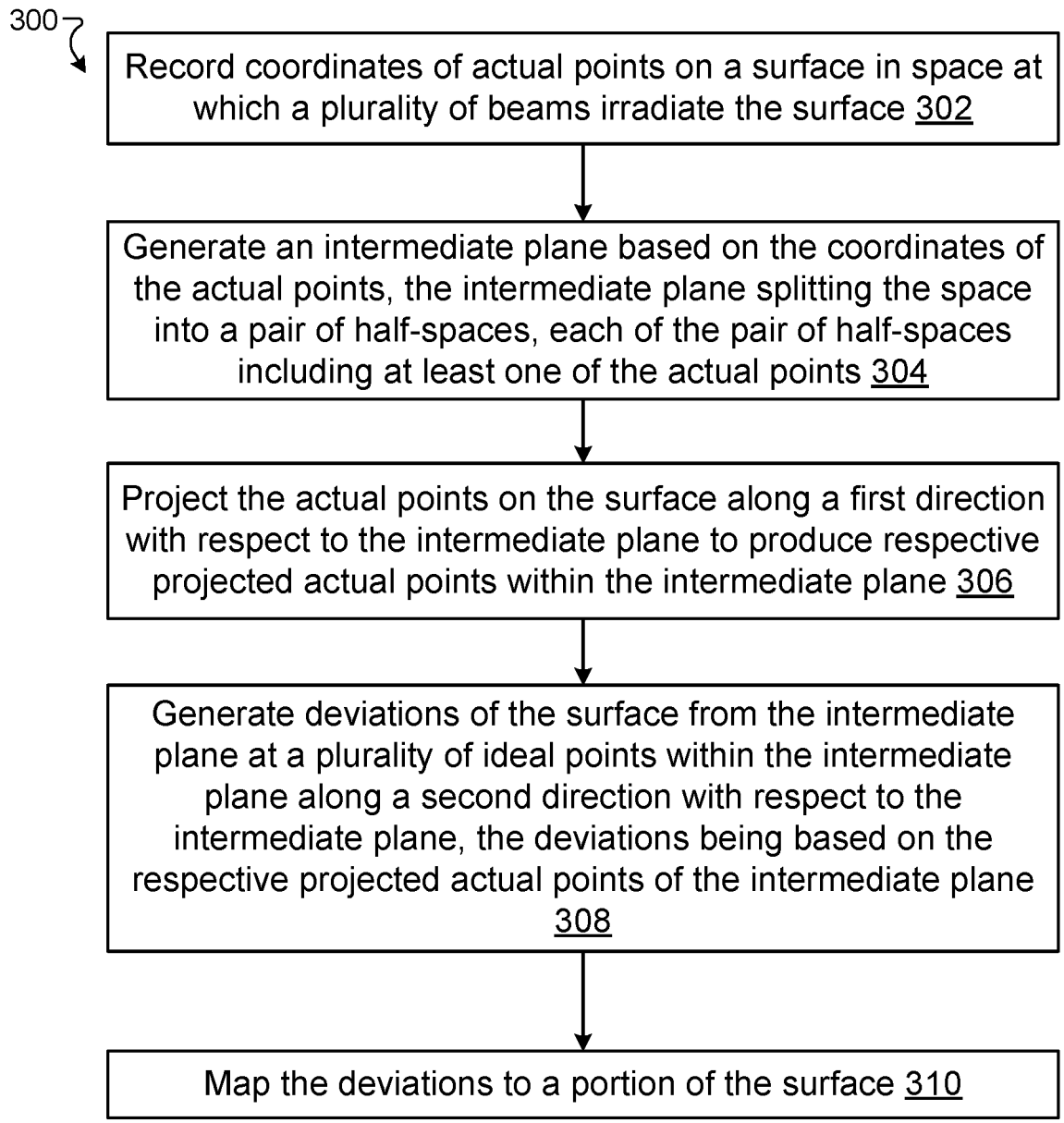
FIG. 3 is a flowchart illustrating an example method for determining dwell location on the surface of an object within the electronic environment illustrated in FIG. 1.

FIG. 3 illustrates an example method 300 of performing the improved technique described herein. The method 300 may be performed by constructs described in connection with FIG. 1, which can reside in memory 126 of the LIDAR system 120 and can be executed by the processing circuitry 124.

At 302, coordinates of actual points on a surface, e.g., surface 112 (FIG. 1) in space at which a plurality of beams, e.g., beams 190(1), 190(2), . . . , 190(N) irradiate the surface are recorded in memory 126. Examples of the actual points may be the beam points 192(1), 192(2), . . . , 192(N) on the surface 112.

At 304, an intermediate plane, e.g., a best-fit plane having data 142 is generated based on the coordinates of the actual points. The intermediate plane splits the space into a pair of half-spaces, such that each of the pair of half-spaces includes at least one of the actual points.

At 306, the actual points are projected, i.e., translated and rotated from a coordinate system of the object to a coordinate system of the intermediate plane, from the surface along a first direction with respect to the intermediate plane to produce respective projected actual points within the intermediate plane. In most implementations, the first direction is along the normal to the intermediate plane although this is by no means required.

At 308, deviations of the surface from the intermediate plane are generated at a plurality of ideal points within the intermediate plane along a second direction with respect to the intermediate plane, the deviations being based on the respective projected actual points of the intermediate plane. In most implementations, the second direction is along the normal to the intermediate plane although this is by no means required.

At 310, the deviations are mapped to a portion of the surface. This mapping is typically performed by searching a library of deviations, e.g., library 140 and finding the closest match with the generated deviations. For example, the LIDAR system 120 may perform a nearest neighbor search over the deviations 140(1), . . . , 140(T) to determine which corresponding location on the surface 112 is closest to the generated deviations. In some implementations, the entry in the library having the smallest difference from the generated deviations will be identified with the current location of the beams on the surface 112. In other implementations, there may be several surrounding entries identified, and the current location may be determined through an interpolating function based on the corresponding locations of those deviations in the library 140.

Figure 4:
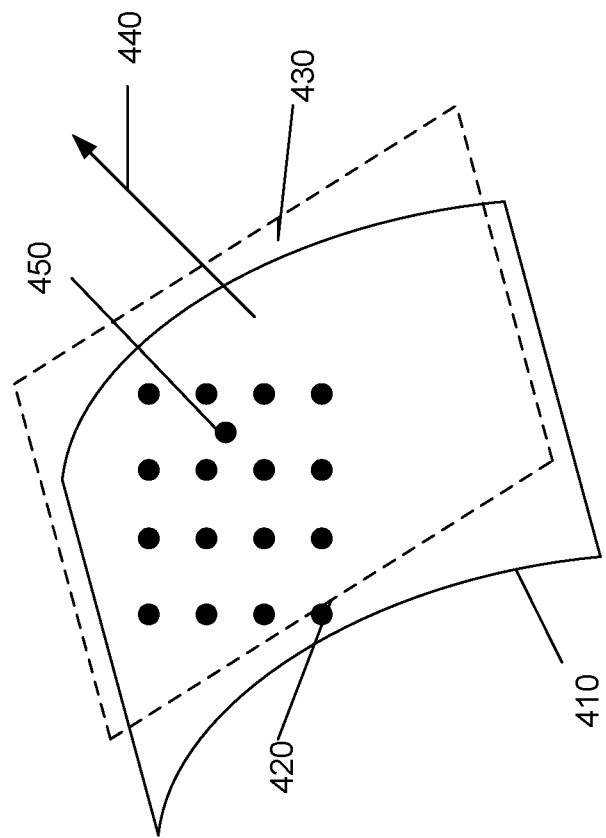
FIG. 4 is a diagram illustrating an example determination of a best-fit plane within the electronic environment illustrated in FIG. 1.
Figure 4:
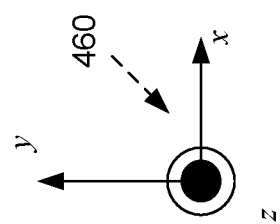

FIG. 4 illustrates an example determination of best-fit plane 430, fit to the points 420 on the surface 410. The best-fit plane 430 is defined by a normal vector 440 and a point 450 in the plane 430. The points 420 have coordinates in the coordinate system 460.

The points 420 are arranged on the surface in some pattern that typically depends on the shape of the laser array 154 (FIG. 1), the local shape of the surface 410, and the angle of incidence of the beams on the surface 410, or the dwell angle. Assume that the $i^{th}$ point 420 has coordinates $x_i=(x_i, y_i, z_i)$ in the coordinate system 460. Then if the equation of a plane is $\hat{n} \cdot x - c = 0$, where $\hat{n}$ is the unit normal vector of the plane and $c = \hat{n} \cdot x_0$ for some point $x_0$ in the plane (i.e., point 450), then the best fit plane may be determined by finding the unknown $\hat{n}$ and c by minimizing the following metric:

$$S = \sum_{i=1}^{N} (\hat{n} \cdot x_i - c)^2$$

In some implementations, the metric may have different weights for each point. For example, some points may be deemed of lower quality than others due to factors such as signal quality and location outside of the object. The weights of such points can be made relatively small or even zero.

Figure 5:
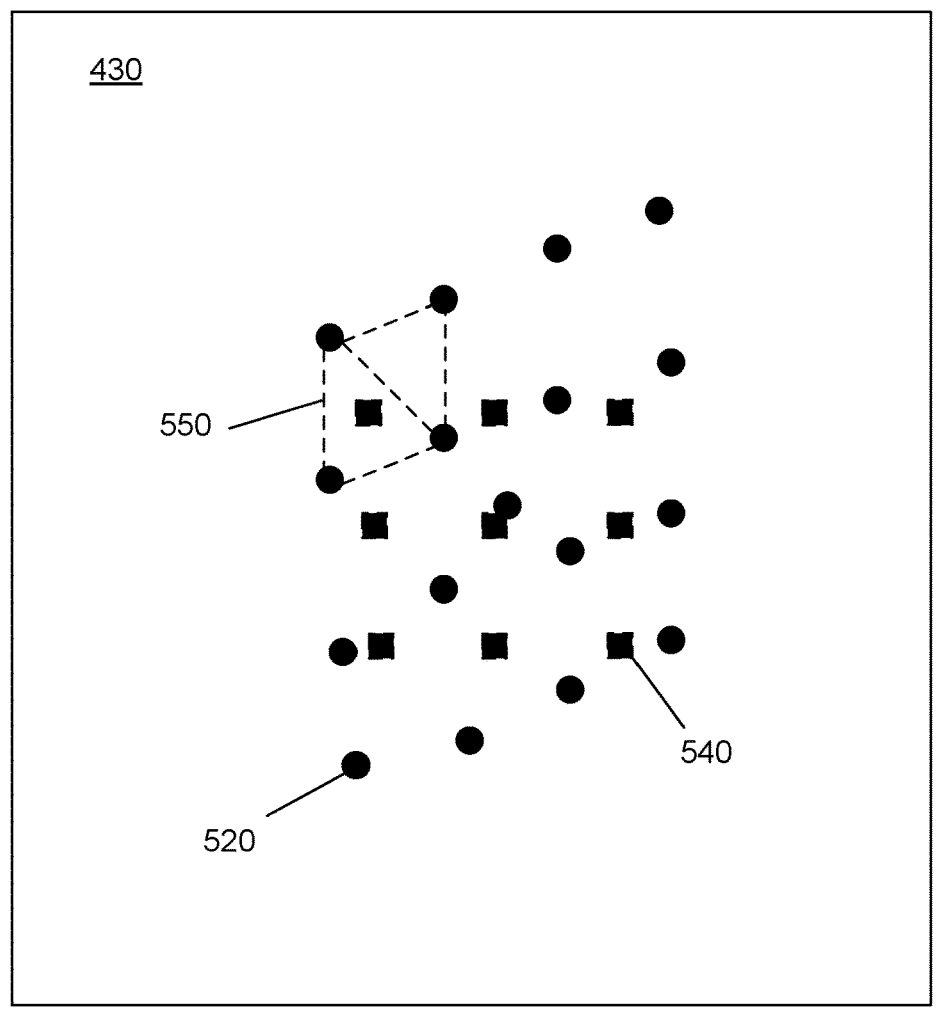
FIG. 5 is a diagram illustrating an example interpolation of the deviations at the ideal points sampled within the best-fit plane illustrated in FIG. 4.
Figure 5:
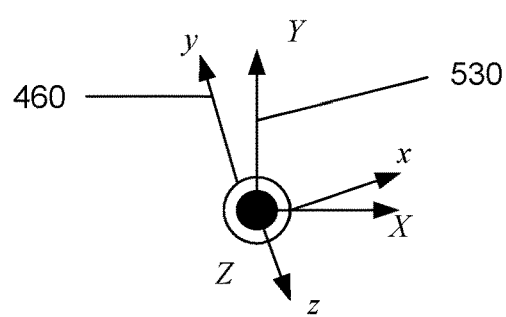

FIG. 5 illustrates an example projection of the points 420 (FIG. 4) on the surface 410 onto the best-fit plane 430 to produce projected points 520 (circles) in the plane 430. Each such projection involves a translation from the surface of the object 410 (FIG. 4) to the best-fit plane 430, and a rotation of the coordinate system 460 into the coordinate system 530 that is aligned with the best-fit plane 430.

The translation of each point on the surface 410 is accomplished by moving the anchor point $x_a$ on the surface 410 along the normal 440 to the plane 430. The origin of the plane coordinate system 530 is given by $X_a' = x_a + [(x_0 - x_a) \cdot \hat{n}]\hat{n}$. The translation operation for each point on the surface 410 then takes the form $X_i' = x_i - X_a'$.

The coordinate system 460 is then rotated to produce the coordinate system 530 aligned with the best-fit plane 430. The rotation is effected by a rotation matrix R, which is constructed as follows. Let the unit vector $\hat{y}$ be the vector pointing in the vertical direction in the object coordinate system 460. The unit vector in the horizontal direction in the best-fit plane coordinate system 530 be denoted as $\hat{X}=\hat{y}\times\hat{n}$. The unit vector in the vertical direction in the best-fit plane coordinate system 530 is denoted as $\hat{Y}=\hat{n}\times\hat{X}=\hat{n}\times(\hat{y}\times\hat{n})=\hat{y}-(\hat{y}\cdot\hat{n})\hat{n}$. Note that the third coordinate in the coordinate system 530 is $\hat{Z}=\hat{n}$. Then the rotation matrix R has as its first column the unit vector $\hat{X}$, as its second column the unit vector $\hat{Y}$, and as its third column the unit normal vector $\hat{n}$. Each point on the surface 410 in the plane coordinate system 530 is then given by $X_i = R \cdot X_i'$.

FIG. 5 also illustrates the ideal points 540 (squares) $\Xi_k = (X_k, Y_k)$ placed among the projected points 520 in the best-fit plane coordinate system 530. As illustrated in FIG. 5 the projected points 520 form a two-dimensional mesh from which an interpolating function F may be defined. For example, by triangulating the mesh to form triangular regions 550, the interpolating function can take the form of a piecewise linear function within each triangular region 550. The output of the interpolating function is $Z_k = F(X_k, Y_k)$ represents the deviations normal to the best-fit plane 430 at each of the ideal points.

The above-described process results in finding the deviations at the ideal points at normal incidence to the best-fit plane 430 rather than the surface 410. Because the deviations are relative to the best-fit plane, there may be an inherent error in the deviations relative to the actual deviations at the ideal points. This error may be corrected by iterating the above procedure until convergence is achieved. Such an iteration is described in FIG. 6.

Figure 6:
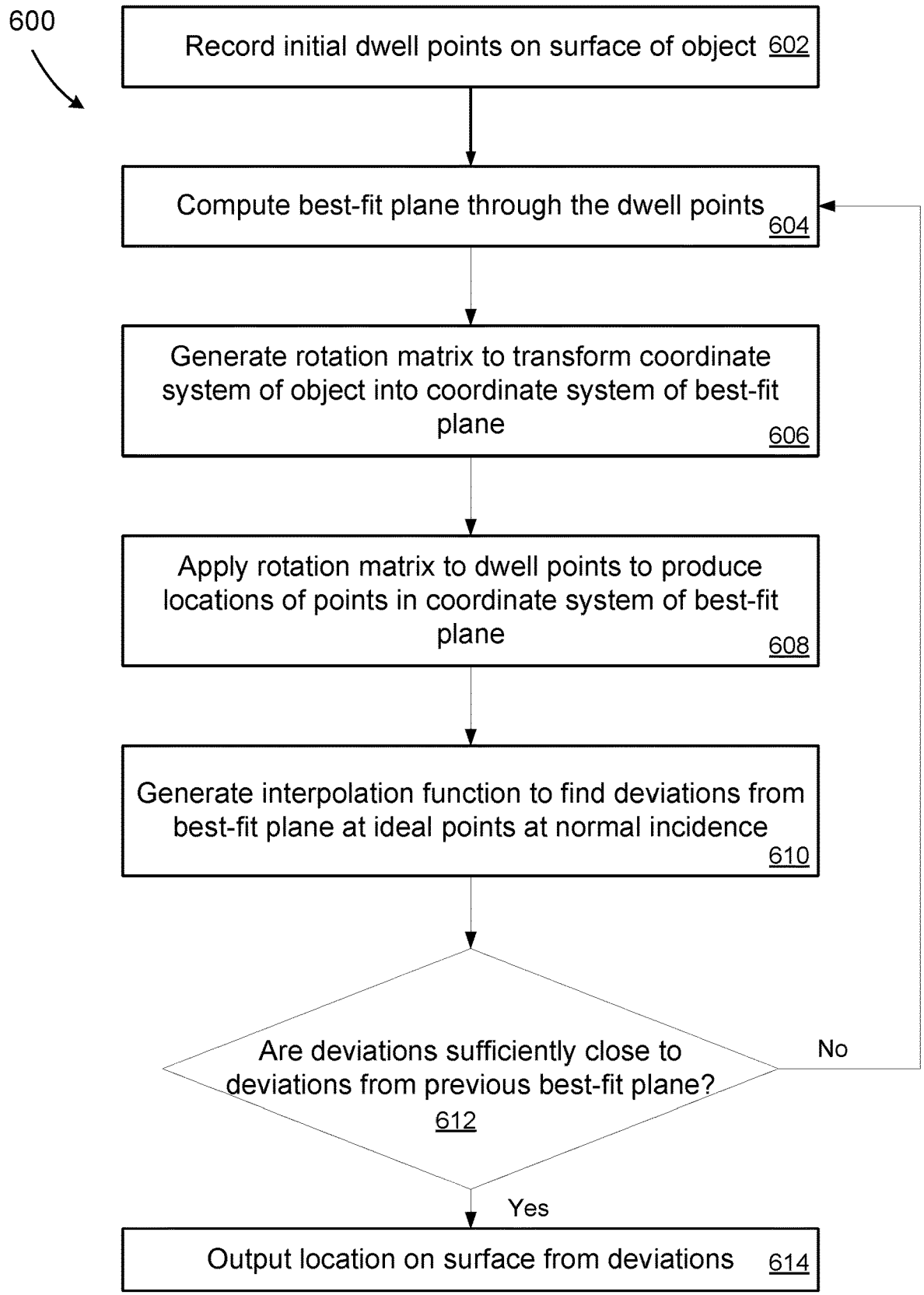
FIG. 6 is a flow chart illustrating an example iterative process of computing the deviations at normal incidence within the electronic environment illustrated in FIG. 1.

FIG. 6 illustrates an example iterative method 600 of computing deviations at normal incidence from a best-fit plane. The method 600 may be performed by constructs described in connection with FIG. 1, which can reside in memory 126 of the LIDAR system 120 and can be executed by the processing circuitry 124.

At 602, the LIDAR system 120 emits beams 190(1), 190(2), ..., 190(N) from the beam array 154 (FIG. 1) onto the surface 112 of the object 110. The radiation from the beams 190(1), 190(2), ..., 190(N) reflects off of a portion of the surface 112 and is detected by the detector 180. Upon detection of the reflected radiation, the LIDAR system 120 records the positions of the dwell points 192(1), 192(2), ..., 192(N) on the surface 112.

At 604, the LIDAR system 120 computes the best-fit plane 430 through the dwell points 192(1), 192(2), ..., 192(N) on the surface 112 as described above with regard to FIG. 4.

At 606, the LIDAR system 120 generates the rotation matrix R as described above with regard to FIG. 5.

At 608, the LIDAR system 120 translates the dwell points 192(1), 192(2), ..., 192(N) to the best-fit plane 430 and applies the rotation matrix R to the translated dwell points to produce the locations of points in the coordinate system 530 of the best-fit plane 430 as described above with regard to FIG. 5.

At 610, the LIDAR system 120 generates an interpolation function based on the points in the coordinate system 530 of the best-fit plane 430 to find the deviations from the best-fit plane at pre-specified ideal points as described above with regard to FIG. 5.

At 612, the LIDAR system 120 compares the deviations computed from the interpolation at the ideal points to deviations computed from a previous iteration of a best-fit plane. For example, when the LIDAR system 120 computes deviations $Z_k^{(1)}$ from an interpolating function, the LIDAR system 120 may compute a new best-fit plane from the ideal points and deviations $Z_k^{(1)}$. The LIDAR system 120 may then project these points onto the new best-fit plane and compute new deviations $Z_k^{(2)}$ as described in 606, 608, and 610. The LIDAR system 120 then determines whether the new deviations $Z_k^{(2)}$ are sufficiently close to the previous deviations $Z_k^{(1)}$. For example, in some implementations, the LIDAR system 120 computes the mean deviation over all of the ideal points, i.e., $$\varepsilon = \frac{1}{K}\sum_{k=1}^{K} |Z_k^{(2)} - Z_k^{(1)}|$$

In this case, when $\varepsilon$ is less than some threshold tolerance, e.g. 0.01, 0.005, or less, or 0.02, 0.03 0.05, or greater, then at 614, the LIDAR system 120 identifies a portion of the surface 112 of the object 110 based on the deviations. Otherwise, when $\varepsilon$ is greater than the threshold tolerance, the LIDAR system 120 repeats the process from 604.

The LIDAR system 120 identifies a portion of the surface 112 from generated deviations at the ideal points using the feature set library 140. Further details of how this is done are discussed with respect to FIGS. 7A and 7B.

Figure 7A:
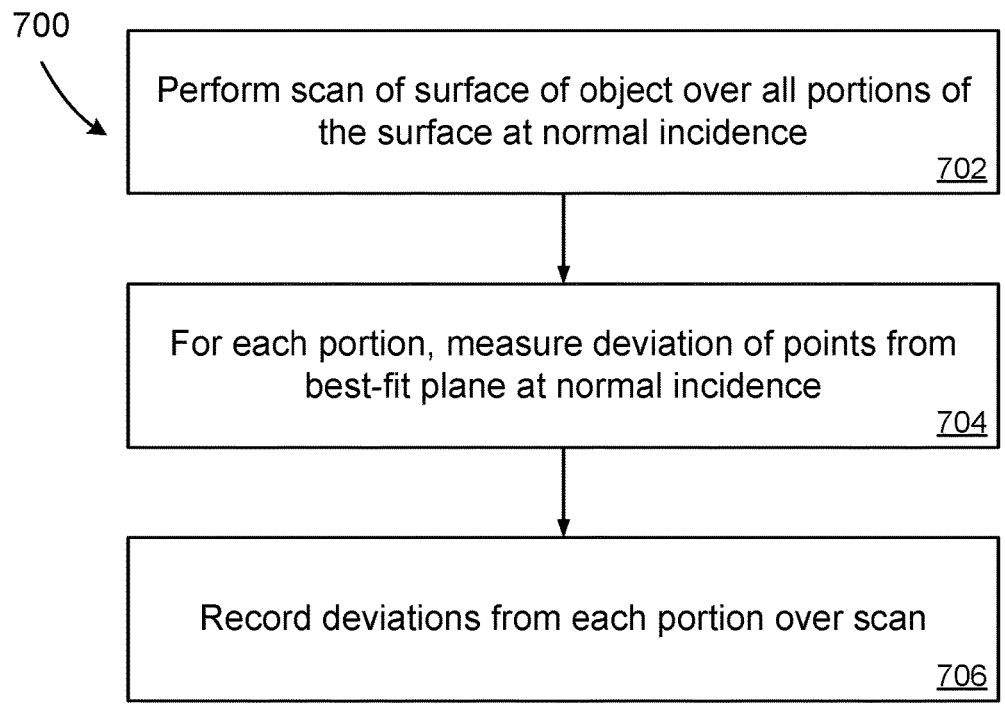
FIG. 7A is a flowchart illustrating an example process of providing a library of deviations from normal incidence from an initial scan of an object surface within the electronic environment illustrated in FIG. 1.

FIG. 7A illustrates an example method 700 of generating the feature set library 140 (FIG. 1). The method 700 may be performed by constructs described in connection with FIG. 1, which can reside in memory 126 of the LIDAR system 120 and can be executed by the processing circuitry 124.

At 702, the LIDAR system 120 scans object 110 to obtain a point cloud of the object 110 to derive the surface normals of the object.

At 704, the LIDAR system 120 measures the deviations of the points from respective best-fit planes at normal incidence at each portion of the surface 112.

At 706, the LIDAR system 120 records the deviations and their parameters that define the respective surface portions in memory 126 as the library 140.

Figure 7B:
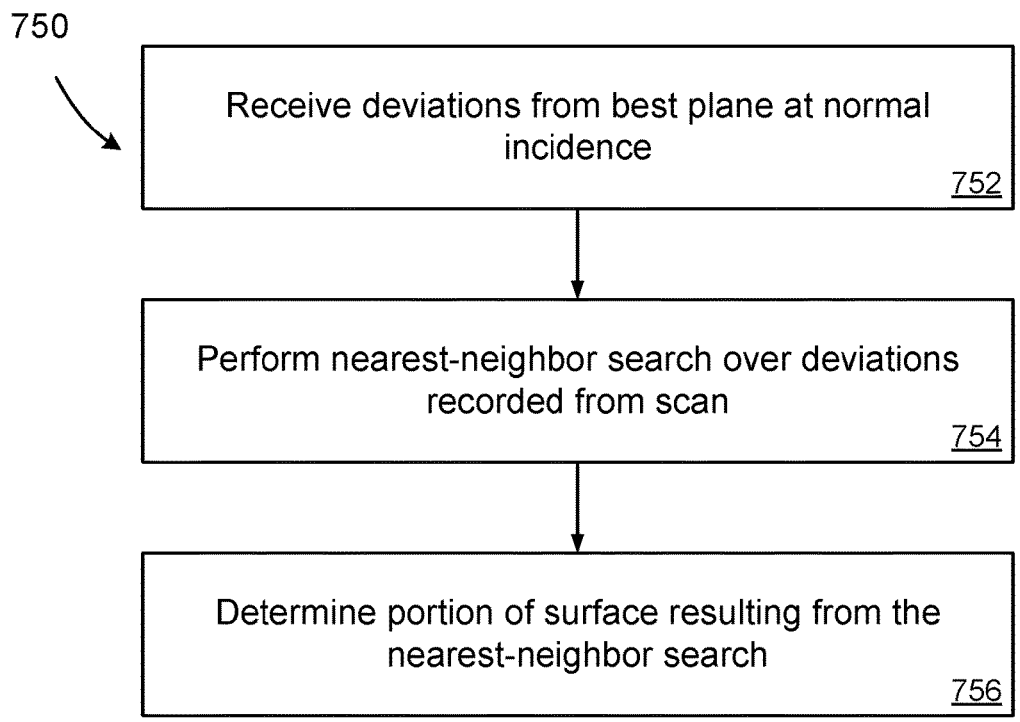
FIG. 7B is a flowchart illustrating an example process of determining a portion of the object surface being tracked from the library provided by the process illustrated in FIG. 7A.

FIG. 7B illustrates an example method 750 of determining a portion of the surface 112 based on computed deviations using the library 140. The method 750 may be performed by constructs described in connection with FIG. 1, which can reside in memory 126 of the LIDAR system 120 and can be executed by the processing circuitry 124.

At 752, the LIDAR system 120 receives the computed deviations from the best-fit plane at the ideal points at normal incidence.

At 754, the LIDAR system 120 performs a nearest-neighbor search over the deviations measured from each portion in the library 140 based on the computed deviations.

At 756, the LIDAR system 120 determines the portion of the surface 112 that results from the nearest neighbor search. As discussed above, this nearest neighbor search allows for a determination of the current dwell location of the beams on the surface 112.

In some implementations, for certain portions of the surface 112 (e.g., corresponding to near an ear or mouth of the face of a person), the LIDAR system 120 monitors acoustic vibrations resulting from breathing. As an example, one might look for acoustic vibrations and then focus in on portions near the ear as a result of finding such acoustic vibrations.

The components (e.g., modules, processors (e.g., a processor defined within a substrate such as a silicon substrate)) of the LIDAR system 120 (e.g., the deviation acquisition manager 130) can be configured to operate based on one or more platforms (e.g., one or more similar or different platforms) that can include one or more types of hardware, software, firmware, operating systems, runtime libraries, and/or so forth. In some implementations, the components of the LIDAR system 120 can be configured to operate within a cluster of devices (e.g., a server farm).

In some implementations, one or more portions of the components shown in the LIDAR system 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the LIDAR system 120 can be, or can include, a software module configured for execution by at least one processor (not shown). In some implementations, the functionality of the components can be included in different modules and/or different components than those shown in FIG. 1.

In some implementations, one or more of the components of the LIDAR system 120 can be, or can include, processors configured to process instructions stored in a memory. For example, the deviation acquisition manager 130 (and/or a portion thereof) can be a combination of a processor and a memory configured to execute instructions related to a process to implement one or more functions.

Although not shown, in some implementations, the components of the LIDAR system 120 (or portions thereof) can be configured to operate within, for example, a data center (e.g., a cloud computing environment), a computer system, one or more server/host devices, and/or so forth. In some implementations, the components of the LIDAR system 120 (or portions thereof) can be configured to operate within a network. Thus, the LIDAR system 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, the LIDAR system 120 may include a memory. The memory can be any type of memory such as a random-access memory, a disk drive memory, flash memory, and/or so forth. In some implementations, the memory can be implemented as more than one memory component (e.g., more than one RAM component or disk drive memory) associated with the components of the LIDAR system 120.

In some implementations, a LIDAR system includes a laser system that includes lasers or laser beams that are configured to move in a pattern or patterns with respect to the object that is being tracked. For example, in some implementations, the scanning/tracking mechanism 152 of the LIDAR system 120 includes a plurality of lasers or beams that are configured to move in a pattern or patterns with respect to the object being tracked.

For example, in some implementations, the LIDAR system 120 may have one mode in which the laser beams are fixed or stationary and a second mode in which the laser beams move in a pattern or patterns such as a shape. In some implementations, two or more of the laser beams move in a pattern or patterns when the LIDAR system 120 is in the second mode. In some implementations, different laser beams may move independently in different patterns.

In other implementations, the LIDAR system 120 includes some lasers or produces some laser beams that are stationary and some that are configured to move in a pattern (or patterns) or shape.

The lasers or beams can move in any pattern or shape. For example, in some implementations, the lasers or beams are configured to move in elliptical shape. In other implementations, the lasers or beams are configured to move in a line, circle, square, rectangle, triangle, or any other shape. In some implementations, the shape or pattern that the lasers or beams move in are dictated or determined by the object that is being tracked. For example, in some implementations, the pattern or shape of the laser movement may be similar to the shape of the object that is being tracked. For example, an elliptical shape or pattern may be used when tracking a face of an individual as the face of an individual is generally elliptical in shape.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a liquid crystal display (LCD or LED) monitor, a touchscreen display, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

In some implementations, the LIDAR system 120 may achieve millimeter range accuracy performance off moving faces of a subject or individual. However, in some implementations, solid object velocity estimation requires processing of multiples samples in order to remove significant velocity components from speech and other biological components. A 500 Hz vibration with an amplitude of 0.05 mm (50 microns) will have a maximum velocity of ($2*\pi*500*5E-5=0.157$ m/sec) about 16 cm/sec. Even though the amplitude of the vibration is an insignificant range change for the process of tracking faces of a subject or individual, the instantaneous velocity may be significant and the vibrational velocity may be removed. In some implementations, removing vibrational velocity may require processing a velocity data sample significantly longer than the periods of the vibrations to be removed and care to avoid noise or bias. For example, noise in the velocity (for example, velocity in the z direction) can affect or degrade the ability to detect or determine the rotation of the object or the z velocity of the object. In some implementations, the vibration or velocity noise is relatively small and can be averaged out to remove its effects.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method comprising:
   recording, by processing circuitry of a remote tracking system, coordinates of actual points on a surface in space at which a plurality of beams irradiate the surface;
   generating, by the processing circuitry, an intermediate plane based on the coordinates of the actual points, the intermediate plane splitting the space into a pair of half-spaces, each of the pair of half-spaces including at least one of the actual points;
   projecting, by the processing circuitry, the actual points on the surface along a first direction with respect to the intermediate plane to produce respective projected actual points within the intermediate plane;
   generating, by the processing circuitry, deviations of the surface from the intermediate plane at a plurality of ideal points within the intermediate plane along a second direction with respect to the intermediate plane, the deviations being based on the respective projected actual points of the intermediate plane; and
   mapping, by the processing circuitry, the deviations to a portion of the surface to produce a location on the surface that is being tracked by the remote tracking system.

2. The method as in claim 1, wherein the intermediate plane is a best-fit plane to the coordinates of the actual points; and
   wherein generating the intermediate plane based on the coordinates of the actual points includes performing a least-squares operation on the coordinates of the actual points to produce the best-fit plane.

3. The method as in claim 1, further comprising, prior to mapping the deviations to the portion of the surface at the plurality of ideal points:
   performing a comparison operation on the deviations to produce a delta with respect to a threshold difference, the delta indicating that a difference between the deviations at the plurality of ideal points and previous deviations is greater than the threshold difference; and
   in response to the measure of the deviations being greater than the threshold difference:
     generating a new intermediate plane based on the coordinates of the ideal points and the deviations;
     projecting the actual points on the surface along a third direction with respect to the new intermediate plane to produce respective new projected actual points within the new intermediate plane; and
     generating deviations of the surface from the new intermediate plane at the plurality of ideal points within the new intermediate plane along the second direction with respect to the intermediate plane.

4. The method as in claim 3, wherein performing the comparison operation includes:
   for each of the plurality of ideal points, generating a difference between a deviation at that ideal point and a corresponding previous deviation to produce a plurality of differences; and
   producing an average of the plurality of differences.

5. The method as in claim 1, wherein each of the surface and the intermediate plane has a respective coordinate system;
   wherein generating the intermediate plane includes producing (i) a first vector indicating the first direction and (ii) a center point, the center point being a point in the plane closest to a specified actual point on the surface along the first direction;

wherein projecting the actual points on the surface along the first direction with respect to the intermediate plane includes:

generating a matrix based on (i) the first vector indicating the first direction and (ii) a second vector indicating a vertical axis of the coordinate system of the surface; and for each of the actual points on the surface, forming a product of (i) the matrix and (ii) a difference between that actual point and the center point.

6. The method as in claim 5, wherein generating the matrix includes:

forming a first cross product of the first vector and the second vector to produce a horizontal direction vector in the intermediate plane;

forming a second cross product of the first vector and the horizontal direction vector to produce a vertical direction vector in the intermediate plane; and forming, as the matrix, the matrix including a first column equal to the horizontal direction vector, a second column equal to the vertical direction vector, and a third column equal to the first vector.

7. The method as in claim 1, wherein generating the deviations of the surface from the intermediate plane at the plurality of ideal points within the intermediate plane along the second direction with respect to the intermediate plane includes:

generating an interpolating function based on the projected actual points of the intermediate plane; and for each of the plurality of ideal points, inputting that ideal point into the interpolating function to produce deviation at that ideal point.

8. The method as in claim 7, wherein generating the interpolating function includes:

producing a triangular mesh in the intermediate plane, the triangular mesh having vertices at the projected actual points of the intermediate plane that form a plurality of triangular regions; and for each of the plurality of triangular regions, producing a linear function of coordinates within that triangular region.

9. The method as in claim 8, wherein mapping the deviations to the portion of the surface at the plurality of ideal points includes performing a nearest neighbor search on the library of surface portions based on the ideal points and the deviations.

10. The method as in claim 1, further comprising, prior to recording the coordinates of the actual points on the surface at which the plurality of beams irradiate the surface:

performing a scan operation over the surface, the scan operation including irradiating each of a plurality of portions of the surface with another plurality of beams to produce a plurality of coordinates for that portion of the surface, each of the plurality of coordinates corresponding to a respective beam of the plurality of beams, and for each of the plurality of portions of the surface, recording the plurality coordinates for that portion of the surface in a library of surface portions.

11. The method as in claim 1, further comprising monitoring acoustic vibrations at the portion of the surface to which the deviations were mapped.

12. The method as in claim 1, where in the beams are light beams emitted by a LIDAR system.

13. A remote tracking system, comprising:

an apparatus configured and arranged to emit a plurality of beams of electromagnetic radiation; and a computing device including memory and controlling circuitry coupled to the memory, the controlling circuitry being constructed and arranged to:

record coordinates of actual points on a surface in space at which the plurality of beams irradiate the surface;

generate an intermediate plane based on the coordinates of the actual points, the intermediate plane splitting the space into a pair of half-spaces, each of the pair of half-spaces including at least one of the actual points;

project the actual points on the surface along a first direction with respect to the intermediate plane to produce respective projected actual points within the intermediate plane;

generate deviations of the surface from the intermediate plane at a plurality of ideal points within the intermediate plane along a second direction with respect to the intermediate plane, the deviations being based on the respective projected actual points of the intermediate plane; and map the deviations to a portion of the surface to produce a location on the surface that is being tracked by the remote tracking system.

14. The system as in claim 13, wherein the intermediate plane is a best-fit plane to the coordinates of the actual points; and wherein the controlling circuitry configured to generate the intermediate plane based on the coordinates of the actual points is further configured to perform a least-squares operation on the coordinates of the actual points to produce the best-fit plane.

15. The system as in claim 13, wherein the controlling circuitry is further configured to, prior to mapping the deviations to the portion of the surface at the plurality of ideal points:

perform a comparison operation on the deviations to produce a delta with respect to a threshold difference, the delta indicating that a difference between the deviations at the plurality of ideal points and previous deviations is greater than the threshold difference; and in response to the measure of the deviations being greater than the threshold difference:

generate a new intermediate plane based on the coordinates of the ideal points and the deviations;

project the actual points on the surface along a third direction with respect to the new intermediate plane to produce respective new projected actual points within the new intermediate plane; and generate deviations of the surface from the new intermediate plane at the plurality of ideal points within the new intermediate plane along the second direction with respect to the intermediate plane.

16. The system as in claim 13, wherein each of the surface and the intermediate plane has a respective coordinate system;

wherein the controlling circuitry configured to generate the intermediate plane is further configured to produce (i) a first vector indicating the first direction and (ii) a center point, the center point being a point in the plane closest to a specified actual point on the surface along the first direction;

wherein the controlling circuitry configured to project the actual points on the surface along the first direction with respect to the intermediate plane is further configured to:
- generate a matrix based on (i) the first vector indicating the first direction and (ii) a second vector indicating a vertical axis of the coordinate system of the surface; and
- for each of the actual points on the surface, form a product of (i) the matrix and (ii) a difference between that actual point and the center point.

17. The system as in claim 13, wherein the controlling circuitry configured to generate the deviations of the surface from the intermediate plane at the plurality of ideal points within the intermediate plane along the second direction with respect to the intermediate plane is further configured to:
- generate an interpolating function based on the projected actual points of the intermediate plane; and
- for each of the plurality of ideal points, input that ideal point into the interpolating function to produce deviation at that ideal point.

18. The system as in claim 13, wherein the controlling circuitry is further configured to, prior to recording the coordinates of the actual points on the surface at which the plurality of beams irradiate the surface:
- perform a scan operation over the surface, the scan operation including irradiating each of a plurality of portions of the surface with another plurality of beams to produce a plurality of coordinates for that portion of the surface, each of the plurality of coordinates corresponding to a respective beam of the plurality of beams, and
- for each of the plurality of portions of the surface, record the plurality coordinates for that portion of the surface in a library of surface portions.

* * * * *